United States Patent [19]

Dittrich

[11] Patent Number: 5,176,029
[45] Date of Patent: Jan. 5, 1993

[54] ULLAGE TUBE VIEWING DEVICE

[75] Inventor: E. Carl Dittrich, Wallingford, Pa.

[73] Assignee: Maritrans Operating Partners L.P., Philadelphia, Pa.

[21] Appl. No.: 880,234

[22] Filed: May 8, 1992

[51] Int. Cl.$^5$ ............................................. G01F 23/02
[52] U.S. Cl. .................................................... 73/323
[58] Field of Search ................. 73/323, 325, 327, 330, 73/334; 116/276; 114/173; 138/89

[56] References Cited

U.S. PATENT DOCUMENTS

| | | | |
|---|---|---|---|
| 2,201,542 | 5/1940 | Kinderman | 73/330 |
| 2,594,113 | 4/1952 | Askin | 73/323 |
| 3,373,610 | 3/1968 | Stieber | 73/334 |
| 3,407,662 | 10/1968 | Tarbox | 73/325 |
| 3,556,038 | 1/1971 | Wolfe | 73/334 |
| 3,752,185 | 8/1973 | Mullins | 116/276 |
| 3,782,809 | 1/1974 | Shropshire | 73/334 |
| 4,182,179 | 1/1980 | Meginnis | 73/330 |
| 4,986,636 | 1/1991 | Contzen et al. | 73/334 |
| 5,125,269 | 6/1992 | Horst, Jr. | 73/325 |

FOREIGN PATENT DOCUMENTS

| | | | |
|---|---|---|---|
| 318871 | 3/1957 | Switzerland | 73/323 |
| 141781 | 4/1920 | United Kingdom | 73/334 |
| 572020 | 9/1945 | United Kingdom | 73/323 |

OTHER PUBLICATIONS

Victor Pyrate Vu-Gage System, Advertising Sheet, Circa 1989.
Mariner's Annual 1991 BFG Marine MFG & Supply Co., Advertisement p. 602-91.
BFG Marine MFG & Supply Advertisement of Welding Type Ullage Plates —date unknown.
NABRICO Catalog 1990, p. H-12 Ullage Hatch.
Hayward/VAC-REL/Memarco Ullage Cover Model No. WUC-2A Catalog Sheet —date unknown.

*Primary Examiner*—William A. Cuchlinski, Jr.
*Assistant Examiner*—G. Bradley Bennett
*Attorney, Agent, or Firm*—Woodcock Washburn Kurtz Mackiewicz & Norris

[57] ABSTRACT

A ullage tube viewing device for visual checking of liquid cargo levels without releasing hazardous vapors is disclosed and a method of quickly installing such device in a ullage tube in the absence of heat.

6 Claims, 2 Drawing Sheets

ULLAGE TUBE VIEWING DEVICE

FIELD OF THE INVENTION

The present invention relates to a ullage tube viewing device for visual checking of liquid cargo levels without releasing hazardous vapors and to a method of installing such device in a ullage tube in the absence of heat.

BACKGROUND OF THE INVENTION

In loading marine vessels such as a ship or barge with a liquid cargo, it is necessary that the marine operator in charge of the loading operation be able to look into the tank and view the level of the product as is rises. Heretofore, it has been the common practice of the tankerman in charge of the loading operation to open certain hatches and ullage tubes on a barge whereby he could view the increase as the product level came into the barge and whereby he could use a gauging device to gauge the product as it came in. With the new Federal Regulations promulgated by the U.S. Coast Guard to control the emission of volatile organic compounds, such previous methods are no longer available because during the loading operation hazardous vapors would be emitted from the barge as the barge is loading. One of the problems to be overcome involved how to gauge the level of the product as well as how to see into the cargo tanks. A number of sight glasses were developed. Each of these required for installation that the barge be in a gas-free state or that the cargo dome be removed from the barge and brought ashore whereby modifications could be made. These modifications in most cases require the use of a burning torch or welding rod to cut out and insert a new foundation or fixture to which a viewing portal could be attached.

Various types of viewing portals have been heretofore available commercially. One is the VP Vu Gage Syste manufactured by Victor Pyrate Limited in Great Britain and sold and distributed in the U.S. by W. B. Arnold Co., Inc., West Caldwell, N.J. These viewing devices are adapted to be affixed to existing ullage tubes in the dome lid or cover of each cargo compartment. The viewing devices are manufactured from cast bronze with a glass cover and can be attached to the ullage tubes with hinges and wing nuts. These devices are adapted to be welded into the dome of the cargo tank hexdome. Pins are used to affix the hinges and the wing nut and the view gauge can then be closed and secured and made vapor tight. This type of viewing gauge affords two means of access to the tank. One is by uncovering the glass viewing port, you can see into the tank and you can look down into the tank to the bottom and you can also use a secondary means of light, either flashlight or the use of a mirror, to aid in illuminating the area inside the tank so you can get a visual viewing of the product level as it rises. In this arrangement, the tankerman would normally use the rungs of the ladder in the tank to determine the level of the cargo. He would normally count down from the deck the number of rungs, knowing how many rungs there were, and he could tell if the tank were approximately ¼, ⅓ or ½ full or at whatever level it might be. Since this viewing gauge was hinged, the tankerman could open the cover and then also look inside the tank when non-volatile organic compounds were being loaded or when the tanker was in an area which did not require reduction of the vapors when loading volatile organic compounds. If this were the case, a flame screen could also be installed in the viewing device. A flame screen is a device which prevents flames from entering the cargo tank that is being loaded should a fire occur on the deck of the vessel. Viewing devices with hinged covers are also necessary to allow for the venting of the vapors in the atmosphere of the tank during loading if there is no other means of evacuating the vapors from the tank. With only a single viewing port, there are times when, such as on a cloudy day or in the evening, it is difficult for the tankerman on the deck in charge of the loading operation to view the level of cargo in the tank. If it becomes necessary to add a second viewing device this time the cost becomes prohibitive because it is necessary to remove the domes or gas-free the barge in order to perform a welding operation.

Accordingly, it would be desirable to be able to install a viewing device in a relatively simple manner without the need of a welding operation and without the removal of the domes or the necessity of gas-freeing the barge.

It is an object of the present invention to provide an improved ullage tube viewing device for visual checking of liquid cargo levels without releasing hazardous vapors and a method of quickly installing the same in the absence of heat, i.e. a welding operation, so as to eliminate the necessity for removing the domes or gas-freeing the barge which results in a loss of time for normal barge use.

It is a further object of the invention to provide a viewing device which when placed in the open end of the ullage tube provides a vapor tight and secure seal around the periphery of the viewing device and supports the viewing glass of the viewing device substantially flush with the end of the ullage tube thereby preventing water or ice accumulation on the viewing glass thus making the viewing device unusable.

SUMMARY OF THE INVENTION

The present invention provides a ullage tube viewing device for visual checking of liquid cargo levels without releasing hazardous vapors. The device comprises a viewing ring for receiving a viewing glass and a viewing glass positioned within the viewing ring. A support ring is carried by the viewing ring for supporting the viewing glass within the viewing ring. The device further includes a bottom ring and means for securing the viewing ring to the bottom ring. The device also includes an elastomer ring seal means mounted on the periphery of the viewing device for exerting an outward pressure against the inner circumference of the ullage tube for maintaining the viewing device in circumferentially sealed relation with the ullage tube with the viewing glass substantially flush with the end of the ullage tube.

In accordance with another aspect of the invention there is provided a method of installing a viewing device in a ullage tube in the absence of heat for visually checking of liquid cargo levels without releasing hazardous vapors. The method comprises the steps of providing a ullage tube viewing device having a viewing glass positioned within a viewing ring and supporting the viewing device within the end of the ullage tube with the viewing glass substantially flush with the end of the ullage tube. The method further requires the step of maintaining the viewing device in circumferentially sealed relation with the ullage tube by utilizing an elastomer ring seal mounted on the periphery of the viewing device for exerting an outward pressure against the inner circumference of the ullage tube.

BRIEF DESCRIPTION OF THE DRAWINGS

The present invention will be more fully understood by reference to the accompanying drawings, in which.

DETAILED DESCRIPTION OF THE PREFERRED EMBODIMENT

Figure 1:
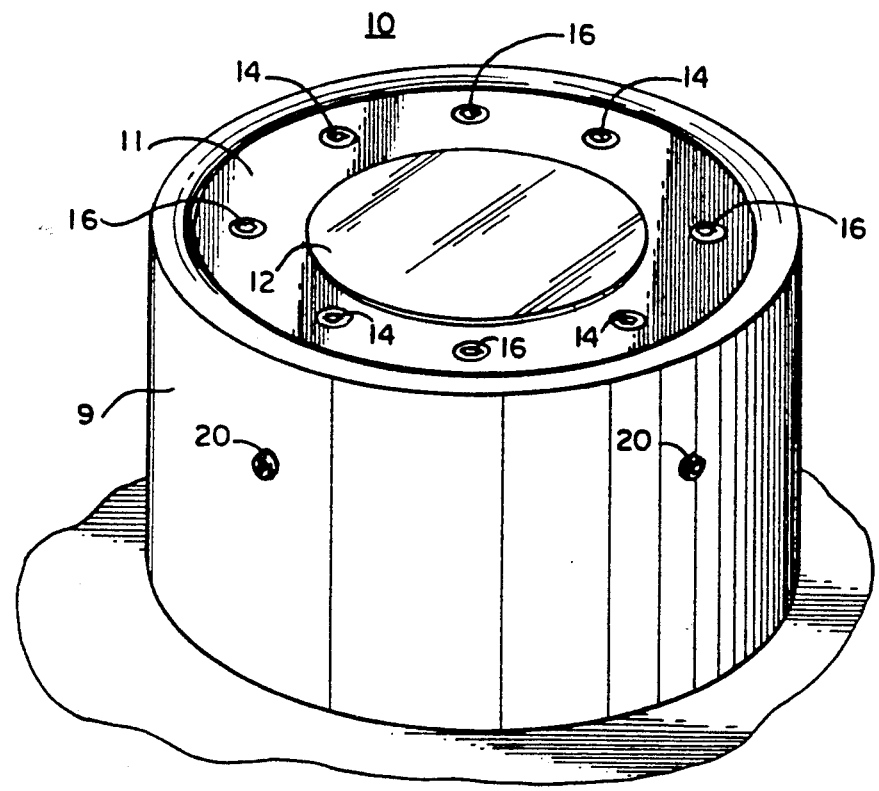
FIG. 1 is a perspective view of a ullage tube viewing device in accordance with the present invention installed in a ullage tube for visual checking of liquid cargo levels without releasing hazardous vapors.
Figure 2:
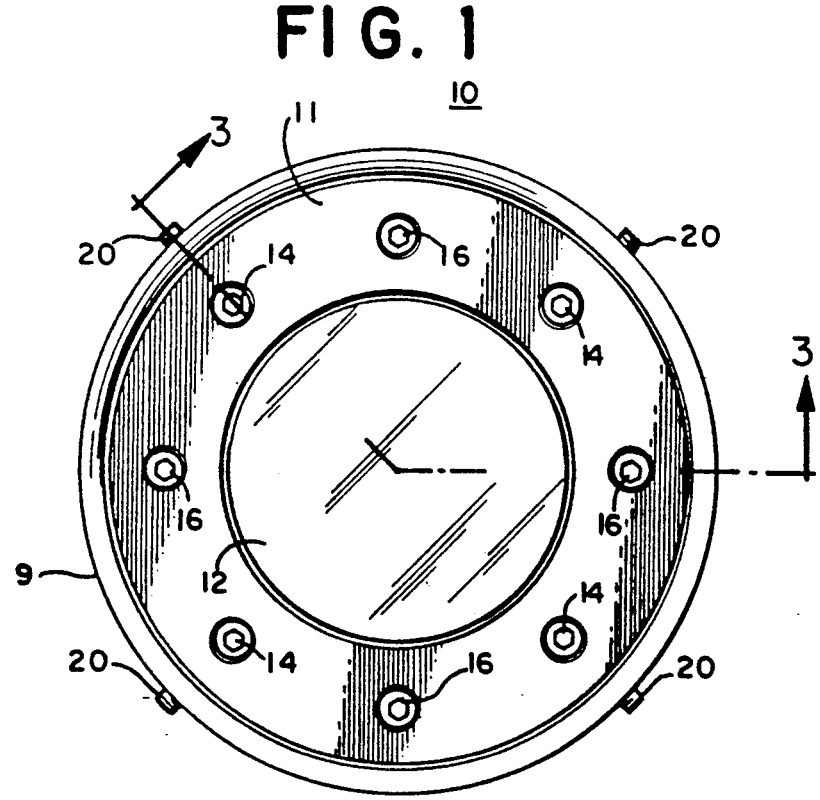
FIG. 2 is a top plan view of the viewing device shown in FIG. 1.
Figure 3:
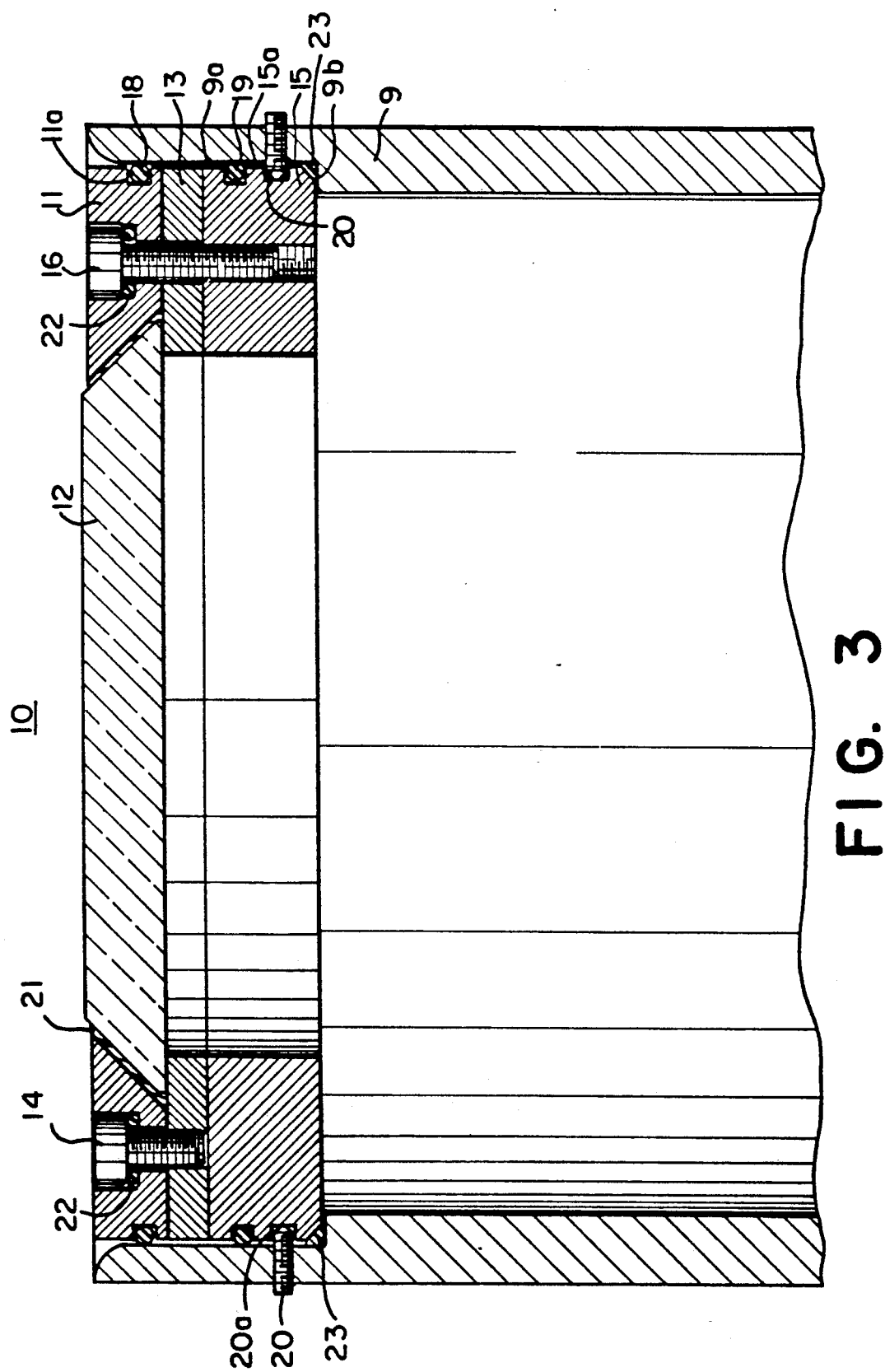
FIG. 3 is a sectional view on enlarged scale taken along the lines 3—3 in FIG. 2.

Referring to FIGS. 1-3 there is illustrated a ullage tube viewing device 10 embodying the present invention for visual checking of liquid cargo levels without releasing hazardous vapors and mounted in the upper end of a ullage tube 9. The viewing device 10 comprises a viewing ring 11 which serves as a frame for receiving a viewing glass 12. A support ring or lower viewing ring 13 is carried by the upper viewing ring 11 for supporting the viewing glass 12 within the viewing ring 11. It will be noted that the inside diameter of the support ring 13 is less than the outside diameter of the viewing glass 12 and thus provides a supporting shoulder for the viewing glass 12. The outer surface of the glass 12 should be at least flush with or slightly above the outer surface of the viewing ring 11 so as to avoid the accumulation of water or other fluid or ice on the glass surface. The viewing ring 11 and the support ring 13 ar held together by a plurality of cap screws 14, four being spaced around the viewing device at equal intervals as illustrated in FIGS. 1 and 2. A spacer ring 15 is threadedly secured to the upper viewing ring 11 by a plurality of cap screws 16. The cap screws 16 are distributed around the viewing device 10 at equal intervals with four being illustrated in FIGS. 1 and 2. The lower viewing ring 13 is sandwiched between the upper viewing ring 11 and the spacer ring 15, the latter forming the bottom ring of the viewing device 10.

As best seen in FIG. 3 the viewing device 10 is installed in the outer end of the ullage tube 9. The internal cylindrical sides of ullage tubes are frequently rough and irregular and not always smooth. In the particular ullage tube 9 illustrated in FIG. 3 the internal surface 9a is provided with a shoulder 9b. However, many ullage tubes do not have such shoulder or the shoulder may be located at different depths from the outer end. Accordingly, the bottom ring 15 is dimensioned so as to support the viewing device within the end of the ullage tube 9 with the viewing glass 12 substantially flush with the end of the ullage tube 9. The viewing device 10 is provided with elastomer ring seal structure mounted on the periphery of the viewing device for exerting an outward pressure against the inner circumferential surface 9a of the ullage tube 9 for maintaining the viewing device 10 in circumferentially sealed relation with the ullage tube. As illustrated in FIG. 3 the elastomer ring seal structure is shown as comprising a pair of O-ring seals 18 and 19. The O-ring seal 18 is mounted in a groove 11a on the periphery of the viewing ring 11. The O-ring seal 19 is similarly mounted in a groove 15a on the periphery of the bottom ring 15. The size of the O-rings 18 and 19 is selected so that when the viewing device 10 is pressed into the outer end of the ullage tube 9, the O-rings 18 and 19 will be compressed and provide a vapor tight seal with respect to the inner wall 9a of the ullage tube 9. Under normal vapor pressures, i.e. up to about 3 psi, the O-rings 18 and 19 will also hold the viewing device 10 in the installed position shown in FIG. 3 without additional securing devices. However, if desired, additional securing devices such as a plurality of dog point set screws 20 may be threadedly inserted through the side walls of the ullage tube 9. The ends of the screws 20 are adapted to extend into the peripheral grooves 20a extending around the bottom ring 15.

To further insure that the viewing device 10 maintains a vapor tight seal, it will be noted that the window 12 has its peripheral edge surface coated with a resilient sealing material 21, such for example as a silicone material or equivalent, for filling the clearance gap between the peripheral edge surface of the window 12 and the mating inclined surface of the viewing ring 11. The sealing material 21 not only acts as a seal with respect to the hazardous vapors but also aids in preventing breakage of the viewing glass 12 during tightening of the cap screws 14 and 16. To further insure the vapor tight seal for the viewing device 10, the cap screws 14 and 16 may be provided with suitable sealing gaskets 22. A bead of silicone 23 may also be placed around the circumference of the shoulder 9b of the ullage tube for forming a vapor tight seal between the inner surface 9a of the ullage tube 9 and the chamfered outside edge of the bottom ring 15.

The sealing gaskets 22, as well as the O-rings 18 and 19 may be made of any suitable materials, including fluorocarbon materials, that are resistant to petroleum products and other types of hazardous vapors or materials that would normally be encountered in liquid cargos. The metal parts of the viewing device 10, including the rings 11, 13 and 15, preferably are corrosion resistant such as stainless steel or bronze and the viewing glass or window 12 should be shock resistant such as a tempered glass or equivalent.

While the ullage tube viewing device of the type described herein provides for visual checking of liquid cargo levels without releasing hazardous vapors, one of its biggest advantages is the fact that it can also be installed very rapidly. For example in an actual installation by a marine mechanic, it has been found that a device of this type can be installed in about five minutes. In another example, twelve viewing devices were installed on a barge by two mechanics in less than an hour. Both installations were accomplished on a vessel which was not gas-free and while the barge was waiting for the loading process to begin. Thus the present invention enables a substantial reduction in cost and lost time normally required for removing the domes or gas-freeing the vessel preparatory to an installation of a viewing device for visually checking of liquid cargo levels.

While there has been described and illustrated a preferred embodiment of the invention, it will be understood that further modifications may be made without departing from the spirit and scope of the invention as set forth in the appended claims.

What is claimed is:

1. A ullage tube viewing device for visual checking of liquid cargo levels without releasing hazardous vapors comprising a viewing ring for receiving a viewing glass, a viewing glass positioned within said viewing ring, a support ring for supporting said viewing glass within said viewing ring so that the outer surface of said viewing glass is substantially flush with the outer surface of said viewing ring, a bottom ring for said viewing device, means for securing said viewing ring to said bottom ring, and elastomer ring seal means mounted on the periphery of said viewing device for exerting an outward pressure against the inner circumference of the ullage tube for maintaining said viewing device in circumferentially sealed relation with the ullage tube with said viewing glass substantially flush with the end of the ullage tube.

2. A ullage tube viewing device according to claim 1 including a resilient sealing material extending around the periphery of the viewing glass and forming a seal between the viewing glass and the inner circumference of the viewing ring.

3. A ullage tube viewing device according to claim 2 wherein said elastomer ring seal means is mounted on the periphery of said viewing ring.

4. A ullage tube viewing device according to claim 1 wherein said elastomer ring seal means comprises a pair of O-rings, one mounted on the periphery of said viewing ring and the other mounted on the periphery of said bottom ring.

5. A ullage tube viewing device according to claim 1 wherein said means for securing said viewing ring to said ullage tube bottom ring comprises a plurality of screws distributed around the viewing device at equal intervals and extending through the viewing ring and threaded into said bottom ring.

6. A method of quickly installing a viewing device in a ullage tube in the absence of heat for visually checking of liquid cargo levels without releasing hazardous vapors comprising the steps of providing a ullage tube viewing device having a viewing glass positioned within a viewing ring so that the outer surface of the viewing glass is substantially flush with the outer surface of the viewing ring, supporting the viewing device within the end of the ullage tube with the viewing glass substantially flush with the end of the ullage tube, and maintaining the viewing device in circumferentially sealed relation with the ullage tube by utilizing an elastomeric ring seal mounted on the periphery of the viewing device for exerting an outward pressure against the inner circumference of the ullage tube.

* * * * *

UNITED STATES PATENT AND TRADEMARK OFFICE
CERTIFICATE OF CORRECTION

PATENT NO. : 5,176,029

DATED : January 5, 1993

INVENTOR(S) : E. Carl Dittrich

It is certified that error appears in the above-identified patent and that said Letters Patent is hereby corrected as shown below:

Col. 6, claim 5, line 5, the words "ullage tube" should be deleted.

Signed and Sealed this

Sixteenth Day of November, 1993

Attest:

BRUCE LEHMAN

Attesting Officer

Commissioner of Patents and Trademarks